March 1, 1927.　　　　　　1,619,366
C. H. A. PETERSEN
TRAP FOR CATCHING CRABS
Filed May 19, 1926

INVENTOR
Christen H.A. Petersen
BY
Peter M. Bousey
ATTORNEY

Patented Mar. 1, 1927.

1,619,366

UNITED STATES PATENT OFFICE.

CHRISTEN HANSEN ALFRED PETERSEN, OF GLENADA, OREGON.

TRAP FOR CATCHING CRABS.

Application filed May 19, 1926. Serial No. 110,059.

This invention relates to new and useful improvements in fishing traps, especially those used for catching crabs, and said device may be used with equally good results in rivers and on the deep sea.

My invention resides in a specially constructed door in said trap, which will be very effective, easy to manipulate and on account of its simplicity inexpensive to manufacture.

Figure 1:
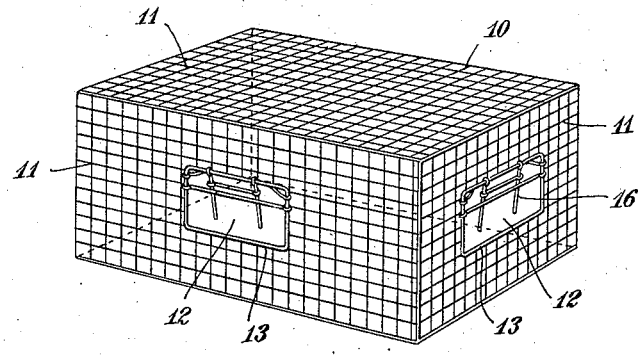
Figure 2:
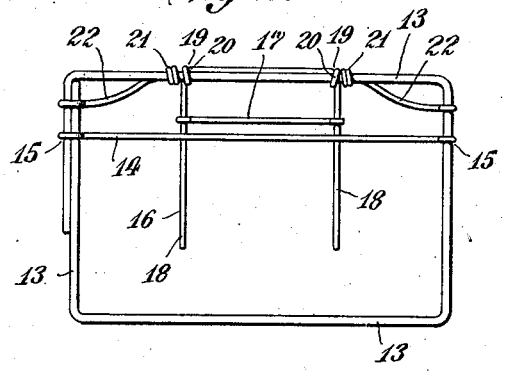
Figure 3:
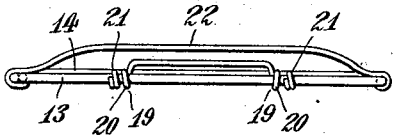
Figure 4:
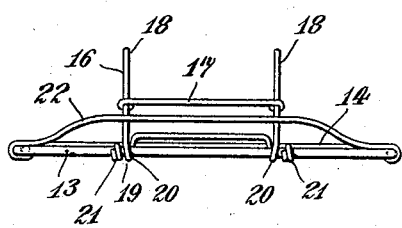

With the above and other objects in view, this invention resides in the novel features of construction, combinations and arrangements of parts to be hereinafter more fully described, claimed and illustrated in the accompanying drawing, in which:

Figure 1 is a perspective view of a crab-trap with my device attached; Figure 2 is a front view of said device; Figure 3 is a top view of same; Figure 4 is a top edge view of said trap illustrating a preferred position of my device.

Referring in detail to the drawings, 10 indicates a preferably rectangular shaped box, or trap, comprising sides, bottom and top made of thin material f. inst. wires as indicated in Figure 1.

Said wires are interwoven, or connected as to form a mesh as at 11, in such a manner as to permit the water to flow freely through the box, while the square opening between the wires is not large enough to permit of any crab of the size desired to withdraw therefrom, when it first has entered through the inlet or opening 12, of which there may be several.

Said trap door comprises a frame 13 made from a single piece of wire and bent upon itself to form a rectangle, although some other shape may do just as well. This frame has a cross-bar 14 bent around, or soldered, to the frame member 13, as at 15. A swing door 16 is made from two pieces of wire, 17 and 18, the wire 17 forming a cross bar with the wire 18. The wire 18 is provided with hinges 19 formed by bending such wire upon itself and being at the same time wound around the tope of the frame-member 13, as shown at 20.

To keep said swing door from sliding, or lateral displacement, the upper part of the frame-member 13 is provided with two projections or shoulders 21 made integral therewith.

To prevent, however, said door from swinging too far back and thereby becoming entangled in the mesh, especially if this for instance should be made from hemp, or rope, instead of wire, I provide a curved stop-bar 22, partly indicated in Fig. 2, and fully seen in Fig. 3; which controls the movement of said door.

In attaching the frame of said trap-door to the box, I prefer to fasten it in such a manner that it stands in a slightly oblique position, that is leaning a little inwardly, and thereby leaving the trap-door a trifle open, as shown in Fig. 4; said disposition has a marked influence on the crabs as an inducement to enter such trap.

While I have shown and described a specific embodiment of my invention, it is obvious that various modifications may be resorted to without departing from the spirit of my invention as set forth in the appended claims.

Having thus fully described my invention, what I claim as new and desire to secure by Letters Patent of the United States, is:

1. A wire box of rectangular shape, with several rectangular inlets provided with trap doors, each of which comprises a rectangular door-frame, having a cross-bar, and a door composed of two pieces of wire, one of which forms a cross-bar on the other, the latter being bent upon itself to form hinges engaging the aforementioned rectangular frame at its top, stop-shoulders on said frame, and a regulation bar attached to said frame at its top to regulate the movement of the trap-door.

2. In an article of manufacture, a rectangular box, comprising a wire mesh, entrances provided in same and consisting of a rectangular frame, having a cross-bar integrally attached thereto; a trap door comprising two pieces of wire, one of these forming a cross-bar with the other, the latter bent upon itself to form hinges and engaging said rectangular frame at its top, stop-shoulders on said frame preventing a lateral displacement of the door, and a curved inwardly bent wire to arrest the movement of said trap-door at a fixed point, substantially as shown and described.

In testimony whereof I have hereunto affixed my signature.

CHRISTEN HANSEN ALFRED PETERSEN.